United States Patent [19]
Grundy
[11] 3,715,737
[45] Feb. 6, 1973

[54] MEMORY ARRAY READOUT WITH LEADING AND TRAILING EDGES OF THE READ SIGNAL

[75] Inventor: Gary L. Grundy, St. Paul, Minn.
[73] Assignee: Sperry Rand Corporation, New York, N.Y.

[22] Filed: May 6, 1971
[21] Appl. No.: 141,038

Related U.S. Application Data

[63] Continuation of Ser. No. 810,153, March 25, 1969, abandoned.

[52] U.S. Cl.....340/174 M, 340/173 R, 340/174 PW, 340/174 WA
[51] Int. Cl..........................G11c 7/00, G11c 11/14
[58] Field of Search......340/173 R, 174 M, 174 PW, 174 WA

[56] References Cited

UNITED STATES PATENTS

| | | | |
|---|---|---|---|
| 3,331,061 | 7/1967 | Marcus | 340/173 R |
| 3,510,856 | 5/1970 | Cline | 340/173 R |
| 3,560,942 | 2/1971 | Enright, Jr. | 340/173 R |

*Primary Examiner*—Vincent P. Canney
*Assistant Examiner*—Stuart Hecker
*Attorney*—Kenneth T. Grace, Thomas J. Nickolai and Charles A. Johnson

[57] ABSTRACT

A scheme for reading out the information content of a memory array on the leading and trailing edges of a unipolar read signal. The sense lines of two memory elements that are simultaneously affected by the read signal couple their associated output signals through associated output gates to a single gated sense amplifier. The output signals are, in turn, coupled to associated different portions of a memory register through associated sense amplifier output gates. The read signal causes the two memory elements to generate associated output signals at both its leading and trailing edges. By properly gating the output signals at the associated output gates at, alternatively, the times of the read signal leading and trailing edges, the information associated with each of the two memory elements is stored in the associated different portions of the memory register.

4 Claims, 7 Drawing Figures

INVENTOR
GARY L. GRUNDY

BY Kenneth T. Grace

ATTORNEY

MEMORY ARRAY READOUT WITH LEADING AND TRAILING EDGES OF THE READ SIGNAL

CROSS REFERENCE TO RELATED APPLICATION

The present application is a continuation application of my parent application, Ser. No. 810,153 filed Mar. 25, 1969, now abandoned.

BACKGROUND OF THE INVENTION

The present invention relates to the electronic data processing art and in particular to the method of reading out the information content of a memory array associated therewith. For the readout of the individual memory elements of such a memory array a read signal is generally coupled to a first conductor with the resulting effect upon such memory element read out on a second conductor. The leading and trailing edges of the read signal normally provide equal but opposite effects upon the memory element providing on the second conductor two readout pulses of like waveform but of opposite polarity-see C. F. Chong et al. U.S. Pat. No. 3,405,399. A gating, or strobe, pulse is timed in coincidence with either the leading or trailing edge of the read signal (and, accordingly, one of the two readout pulses) to gate out the information content of the read out memory element. The gated readout pulse is, in turn, coupled to a sense amplifier which interprets, generally by its polarity, the nature of the readout pulse as being indicative of the information content of the readout memory element. Accordingly, for each memory element read out in parallel, i.e., in time coincidence there is required an associated sense amplifier. AS sense amplifiers are very expensive in comparison to other elements normally used with the memory system it is very desirable that the number of sense amplifiers be reduced to a minimum.

SUMMARY OF THE INVENTION

The present invention relates to a scheme for reading out the information content of the memory elements of the memory array on the leading and trailing edges of the read signal. The scheme involves coupling the output, or sense, lines that are associated with each of at least two memory elements that are simultaneously affected by the read signal through sense line output gates to a single gated sense amplifier. The output of the sense amplifier is, in turn, coupled to two portions of a memory register by means of associated sense amplifier output gates. First and second gating, or strobe, pulses timed in coincidence with the leading and trailing edges, respectively, of the read signal gate the sense line output gate, the gated sense amplifier and the sense amplifier output gate. Accordingly, the output signal that is associated with the leading edge of the read signal that affects the first memory element is gated into the first portion of the memory register while the output signal that is associated with the trailing edge of the read signal that affects the second memory element is gated into the second portion of the memory register. As only one sense amplifier is required, the number of sense amplifiers required for the memory system is halved. The decrease in the requirement in the number of sense amplifiers, each being very expensive, when combined with the increase in the number of gates, selectors and associated logic, each being very inexpensive, provide an overall substantial savings in the cost of the memory system.

Further reduction in sense amplifier requirements may be achieved by coupling successive read signals to simultaneously affected memory elements. Low level switches or gates, which are associated with each of the sense lines, that are to be coupled in parallel to the single sense amplifier and that are to couple, in parallel, the sense amplifier output to the memory register, are strobed, as before, on the leading and trailing edges of the successive read signals. As an example, for the reduction of the number of sense amplifiers to one-fourth that previously required, four sense lines, through their associated gates, are coupled in parallel to a single sense amplifier the output of which through four associated gates is coupled in parallel to four portions of the memory register. In time coincidence, or concurrently, with the leading and trailing edges of the two required read signals four strobe pulses gate the four output signals from the four sense lines into the four portions of the memory register in serial fashion from the parallel coupled memory elements.

DESCRIPTION OF THE PREFERRED EMBODIMENTS

Figure 1:
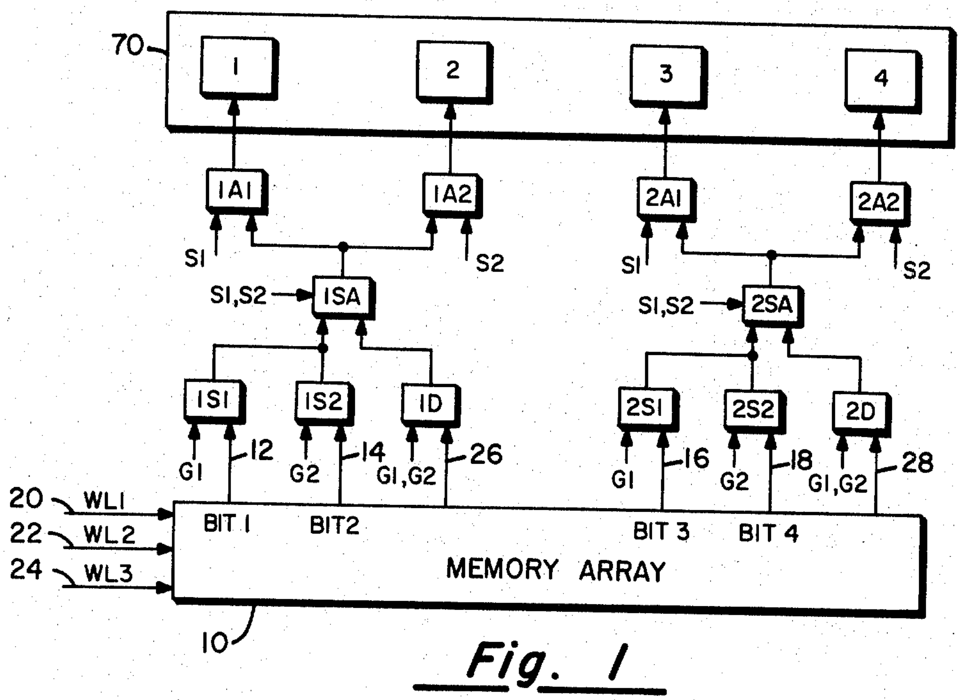
FIG. 1 is an illustration of a first preferred embodiment of the present invention.

With particular reference to FIG. 1 there is presented an illustration of a first preferred embodiment of the present invention. The memory system of FIG. 1 includes an electrically alterable memory array 10 comprised of a plurality of electrical word line conductors, which are plated with a thin-ferromagnetic-film layer, that function as the memory elements. Such memory systems are well-known; an excellent background for such memory systems appears in the publication "A 500-Nanosecond Main Computer Memory Utilizing Plated-Wire Elements," AFIPS, Conference Proceedings, Volume 29, 1966, FJCC, pages 305–314. Such plated-wire memory systems utilizing the magnetization of an area along a conductive wire that is plated by a thin-ferromagnetic-film layer as the memory element may be operated in the well-known word-organized or bit-organized memory systems. The high volumetric efficiency achieved by such memory systems must necessarily bring the several areas of magnetization, each representing the discrete bits of digital data, and their associated circuitry into closer proximity whereby there arises "-noise" signals that are similar to those obtained in more conventional toroidal ferrite core arrays. With the plated-wire digit lines, 12, 14, 16, 18, which are normally established in a parallel, planar array, enveloped by a plurality of word lines 20, 22, 24 arranged orthogonal thereto, there is provided the normal capacitive and inductive coupling between adjacent digit lines and word lines whereby memory selection currents may induce noise signals in the selected digit lines that are of such a magnitude as to substantially block out the digital significance of the readout signal.

Prior art techniques utilized to eliminate, or reduce, deleterious noise signals have incorporated within the memory array a "dummy" wire or line. In toroidal ferrite core arrays such dummy lines generally consist of a conductor running parallel to and associated with a particular output or sense line such that the dummy line and the output line are effected by substantially the same noise signals whereby there is induced in such lines similar common mode noise signals. The dummy line and the associated output or sense lines are coupled to a gated differential sense amplifier which cancels out the common mode noise signals leaving only the desired readout signal as an output therefrom. The copending patent applications of J. M. Cline, Ser. No. 701,433, filed Jan. 29, 1968, now U.S. Pat. No. 3,510,856 and A. E. Liepa, Ser. No. 701,591, filed Jan. 30, 1968, now U.S. Pat. No. 3,533,083, disclose such plated-wire memory systems and their dummy wire selection schemes. The packaging of memory array 10, word lines 20,22,24 digit lines 12, 14, 16, 18 and dummy lines 26, 28 may be similar to that of the copending patent application of J. F. Bruder, Ser. No. 647,017, filed June 19, 1968, now Pat. No. 3,484,765.

Figure 2:
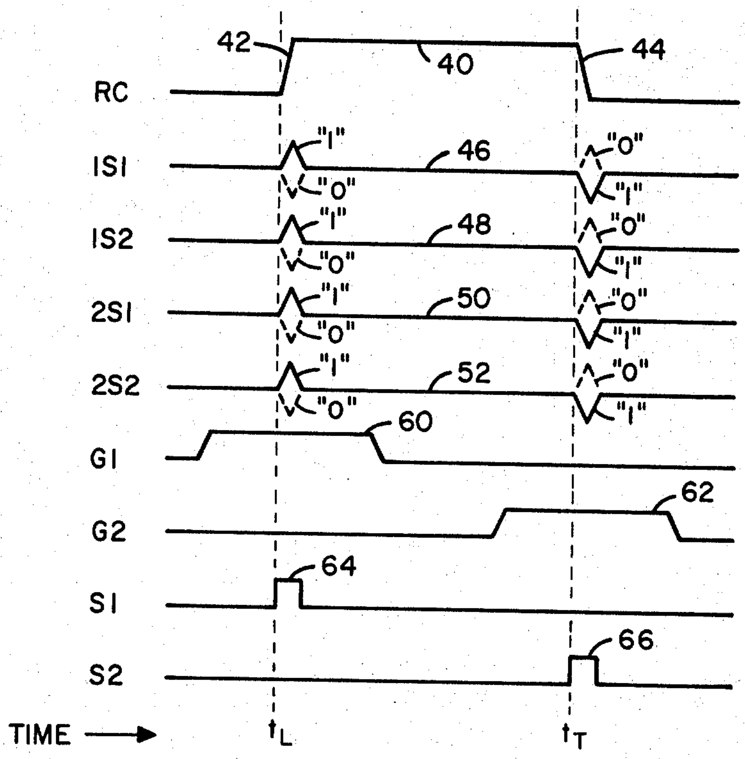
FIG. 2 is an illustration of a timing diagram associated with the embodiment of FIG. 1.

With particular reference to FIG. 2 there is presented an illustration of a timing diagram of the signal waveforms associated with the embodiment of FIG. 1. Operation of the memory system of FIG. 1 involves the coupling of a unipolar read current signal 40, having a leading edge 42 and a trailing edge 44, to one of the word lines 20, 22, 24, along which all the ordered bits of a multibit word are arranged. The coupling of signal 40 to a selected word line, e.g., word line 20, affects the memory areas at the intersections of word line 20 and digit lines 12, 14, 16, 18 whereby there are induced in such digit lines the associated output signals 46, 48, 50, 52, respectively. Additionally, the selected word line 20 induces in the intersecting dummy lines 26, 28 noise signals which are, in turn, coupled to one of the inputs of gated differential sense amplifiers 1SA, 2SA, respectively, by low level dummy line switches 1D, 2D, respectively.

Coincident in time with and overlapping in duration leading edge 42 of current signal 40, as at time $t_L$, a first gating pulse 60 is coupled to switches 1D, 2D and to low level digit line switches 1S1, 2S1, passing the output signals on digit lines 12, 16 therethrough forming an input to the associated sense amplifiers 1SA, 2SA, respectively.

At time $t_L$ strobe pulse 64 coupled to sense amplifier 1SA and its associated AND gate 1A1 and to sense amplifier 2SA and its associated AND gate 2A1 whereby the binary significance, either a "1" or a "0," of time $t_L$ outputs of waveforms 46, 50 is gated into the odd numbered stages 1, 3, respectively, of memory data register 70. Thus, after time $t_L$ the binary significance of the odd numbered bits, bits 1 and 3, of the word associated with word line 20 have been read out of memory array 10 and stored in register 70.

Overlapping the trailing edge 44 of signal 40, as at time $t_T$, and coincident therewith, gate pulse 62 is coupled to switches 1D, 2D and to low level digit line switches 1S2, 2S2 passing output signals 48, 52 therethrough. As with the read operation at time $t_L$, the binary significance, either a "1" or a "0," of waveforms 48, 52 at time $t_T$ form inputs to the associated sense amplifiers 1SA, 2SA.

At time $t_T$ strobe pulse 66 is coupled to sense amplifier 1SA and the associated AND gate 1SA and to sense amplifier 2SA and the associated AND gate 2A2 whereby the binary significance of the output signals 48, 52 at time $t_T$ as read out on lines 14, 18 respectively, is coupled to the even numbered stages 2, 4, respectively, of register 70. Thus, after the termination of the read current signal 40 the bits 1, 2, 3, 4 of the four-bit word associated with word line 20 have been read out of memory array 10 and stored in register 70.

With particular reference to FIGS. 3*a*, 3*b*, 3*c* and FIG. 4 there are presented illustrations of a second preferred embodiment of the present invention and the associated signal waveforms. This embodiment illustrates a memory system including a plated-wire memory array 80 that is arranged into: eight groups of parallel arranged digit lines, each group including first (associated with the odd numbered bits of the group) and second (associated with the even numbered bits of the group) sets of digit lines, each set including eight digit lines and one electronically associated dummy line; and, 1024 orthogonally arranged word lines. As discussed with particular reference to FIG. 1, each word line, digit line intersection of memory array 80 forms an associated memory area for storing 1 bit of binary information; thus, all the bits of a word are, as in FIG. 1, organized along a single word line, i.e., are word-organized.

Each group is, in turn, externally coupled to a single gated differential sense amplifier 1SA–8SA; the eight digit lines and the electronically associated dummy line of each of the two sets of each group are coupled in parallel to the two inputs of the associated gated differential sense amplifier. The output of the gated differential sense amplifier, e.g., 1SA, is, in turn coupled in parallel to associated first and second AND gates, e.g., 1A, 2A, whereby first and second strobe pulses S1, S2 gate the odd and the even numbered bits of the addressed word, i.e., addressed by an energized word line and an energized digit line selector LS, through the associated first and second AND gates and into the associated odd and even numbered stages, e.g., stages 1 and 2, respectively, of the memory data register 82, all under control of memory controller 78.

As there are eight digit lines and one electronically associated dummy line per set and as there are two sets per group, there are further provided eight digit line selectors 1LS–8LS, and one dummy line selector DS which couple first and second gate pulses G1, G2 to the associated like-ordered low level digit line and dummy line switches. As an example, digit line selector 1LS couples, in parallel its first gate pulse G1 to the associated odd numbered low level digit line switches 1S1 of group 1, 3S1 of group 2–15S1 of group 8, and its second gate pulse G2 to the even numbered low level digit line switches 2S1 of group 1, 4S1 of group 2–16S1 of group 8. Concurrently therewith, dummy line selector DS couples, in parallel, its second gate pulse G2 to the dummy line that is electronically associated with the odd numbered digit lines and its first gate pulse G2 to the dummy line that is electronically associated with the even numbered digit lines. This dummy wire selection system may be similar to that of the above referenced patent application of A. E. Liepa.

At times $t_L$, $t_T$, sense amplifier selector SAS couples, in parallel, strobe pulses S1, S2, respectively, to sense amplifiers 1SA–8SA gating the associated sense amplifier output signal therethrough. The sense amplifier output signal is, in turn, coupled in parallel to the associated first and second AND gates, e.g., AND gates 1A, 2A associated with sense amplifier 1SA.

At time $t_L$ byte selector BS couples, in parallel, strobe pulse S1 to the first AND gates of each group, e.g., AND gate 1A of group 1, gating the sense amplifier output signal into the odd numbered stage, e.g., stage 1, of register 82.

At time $t_T$ byte selector BS couples, in parallel, strobe pulse S2 to the second AND gates of each group, e. g., AND gate 2A of group 1, gating the sense amplifier output signal into the even numbered stage e. g., stage 2 of register 82.

Figure 4:
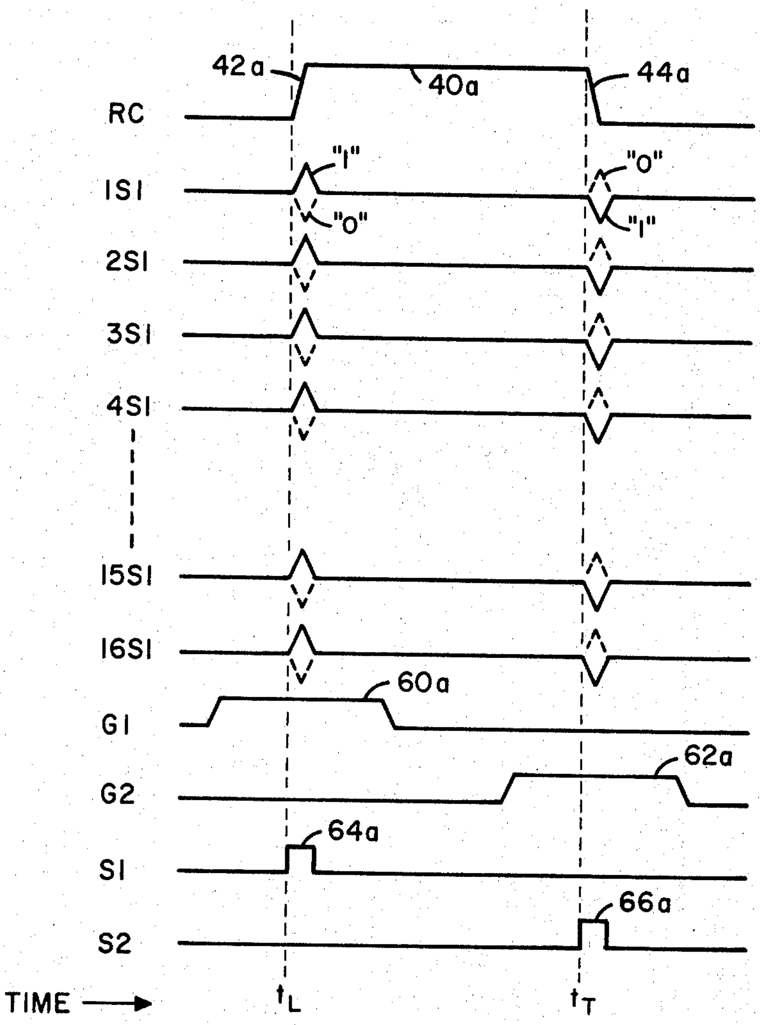
FIG. 4 is an illustration of a timing diagram associated with the embodiment of FIG. 3.
Figure 3:
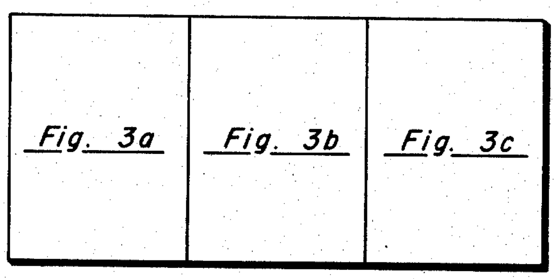
FIG. 3 is an arrangement of a second preferred embodiment illustrated in FIGS. 3_a_, 3_b_, 3_c_.

Thus, after the termination of the read signal the bits 1, 2, 3,–16 of the 16-bit word associated with the selectively energized word line of memory array 80 have been read out of memory array 80 and stored in register 82. With particular reference to FIG. 4 there is presented an illustration of a timing diagram associated with the embodiment of FIG. 3. as discussed, in general, above. It is apparent that upon a comparative inspection of the timing diagrams of FIG. 2 and FIG. 4 that such timing diagrams are substantially similar in form and content. The only basic difference between the timing diagram of FIG. 4 as compared to the timing diagram of FIG. 2 is the inclusion of more digit line output signals produced by the single read signal 40*a*. For the purpose of pointing out the similarity of the operation of the illustrated embodiments of FIG. 1 and FIG. 3, like waveforms of FIG. 2 and FIG. 4 are identified by like reference numbers having the appropriate suffix affixed thereto.

Thus, in consideration of the embodiments of applicant's invention as illustrated and discussed herein it is apparent that applicant has provided an improved scheme for reading out the information content of a memory array, the improved operation thereof consisting of the reading out of the odd and of the even numbered bits of the read out word on the leading and the trailing edges of the read signal.

Figure 3A:
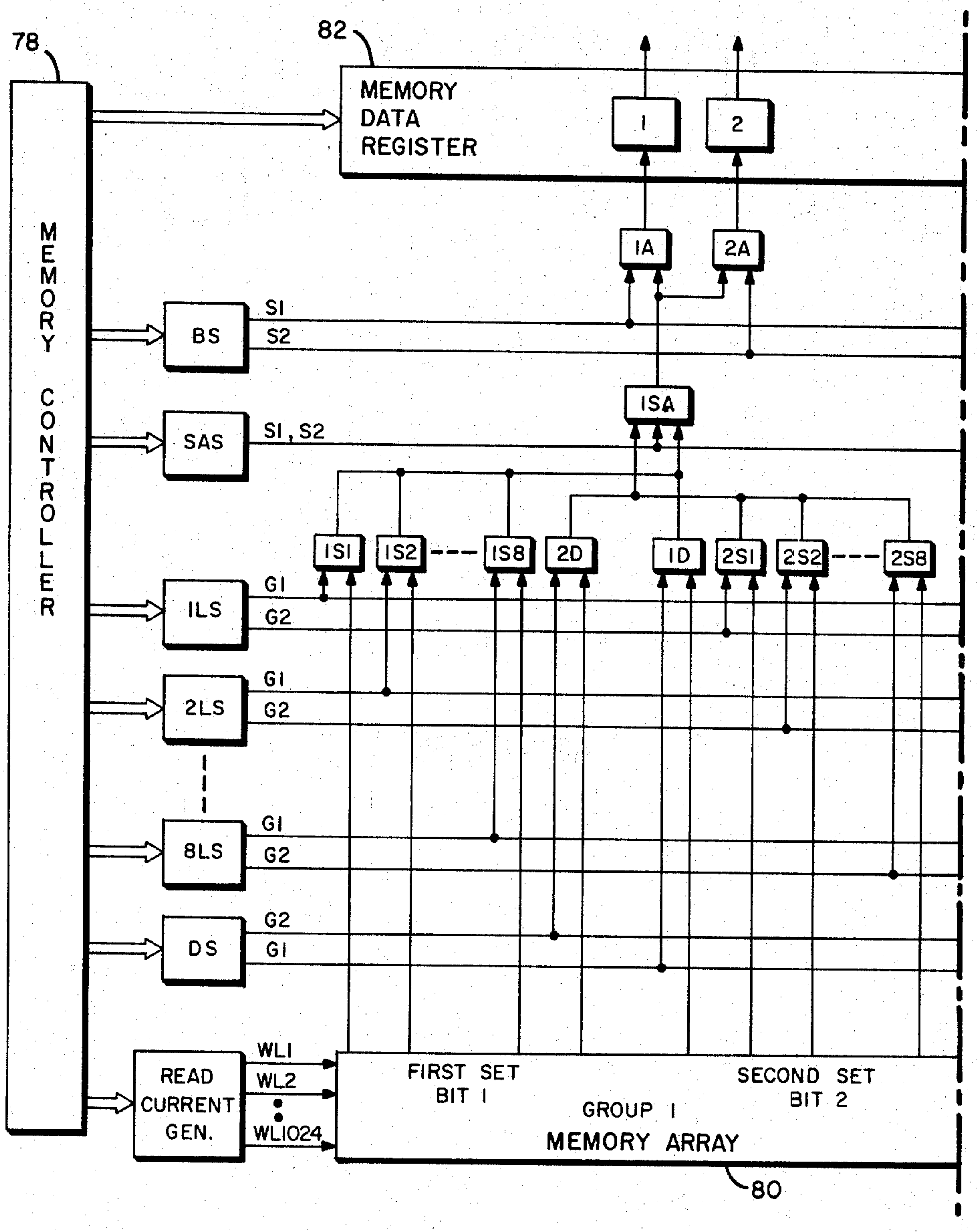
Figure 3B:
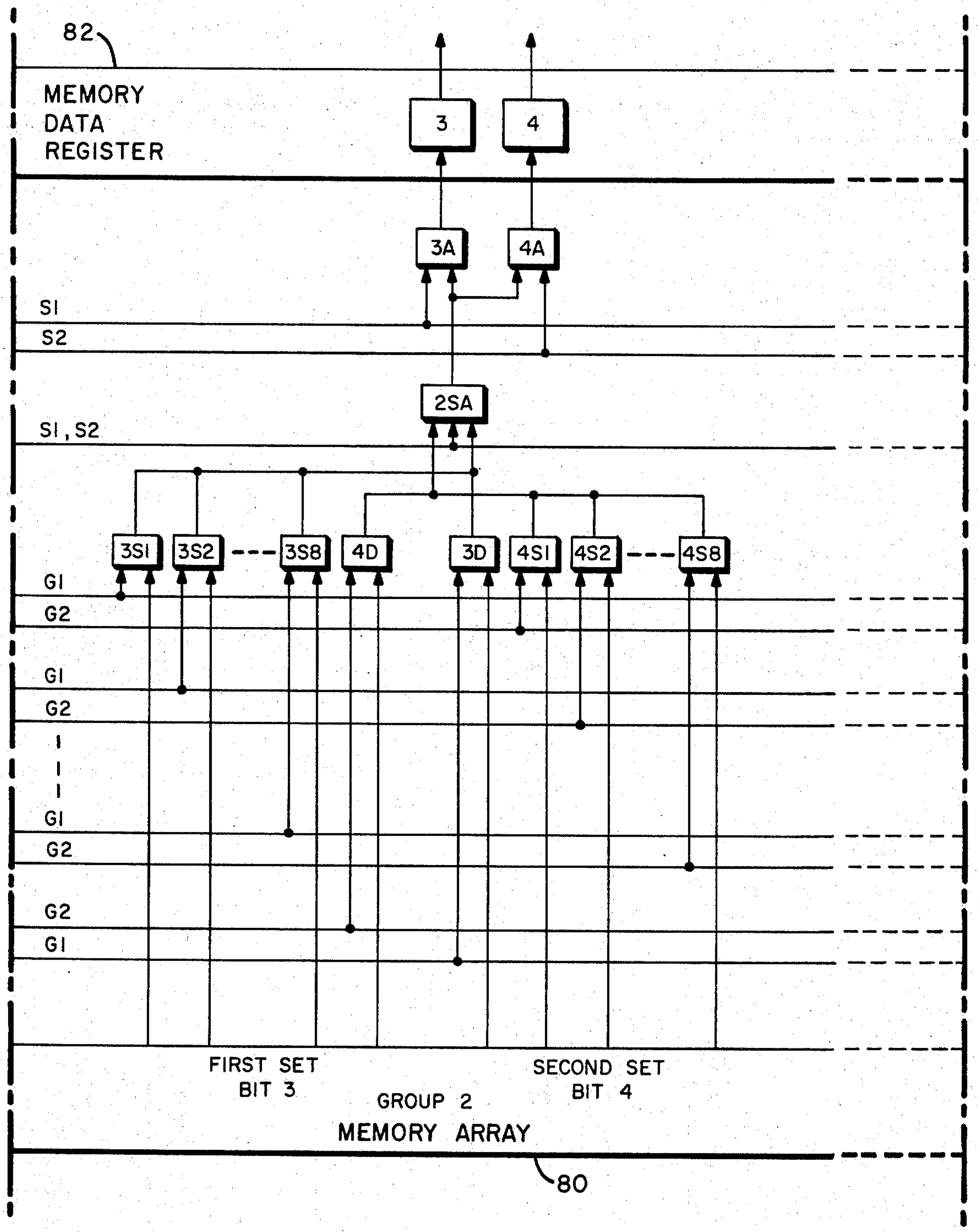
Figure 3C:
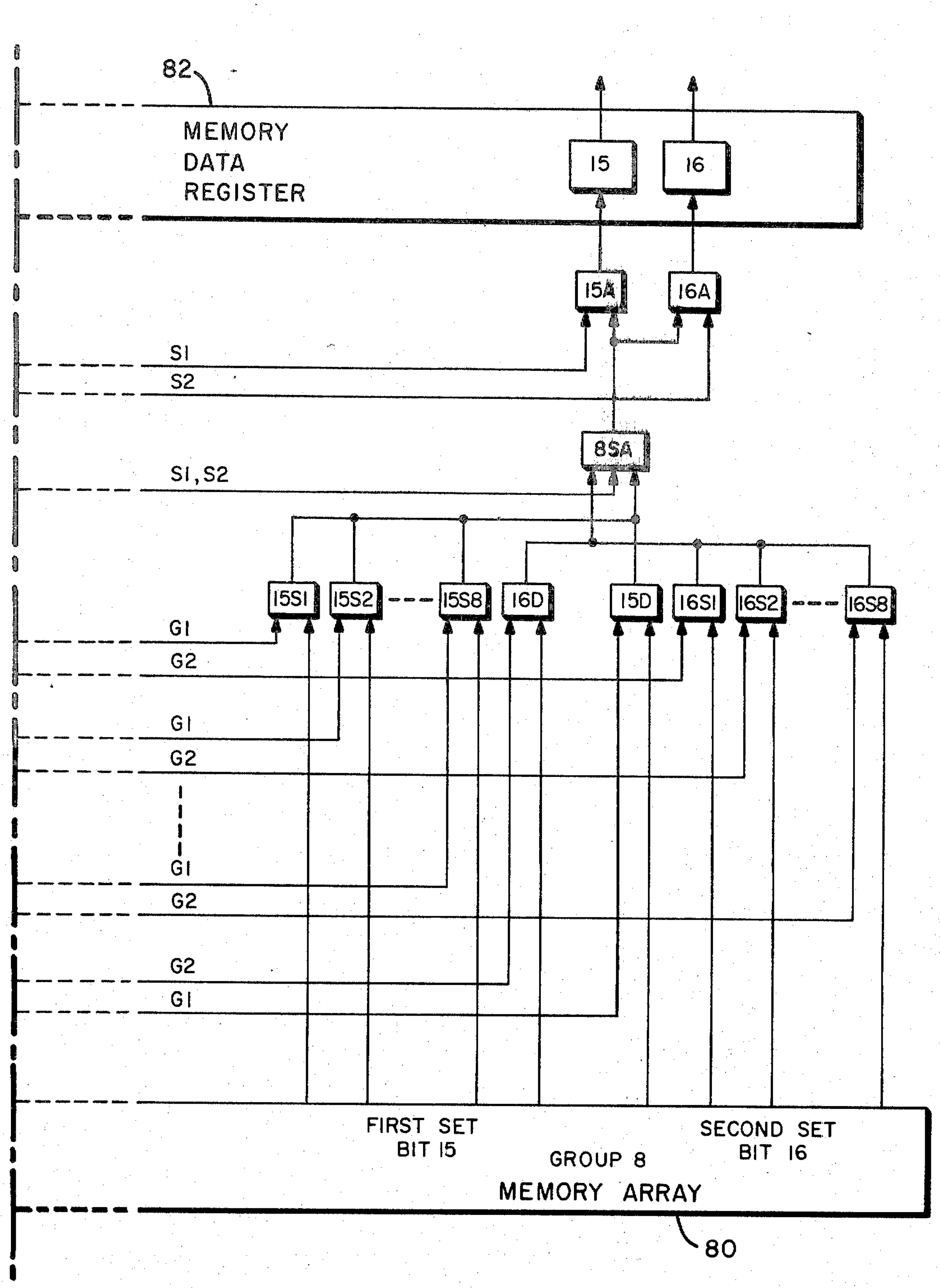

To implement applicant's preferred embodiments of FIG. 1 and of FIGS. 3*a*, 3*b*, 3*c* whereby the information content of the odd and even numbered stored bits of the readout word is read out on the leading and trailing edges, respectively, of the read signal, certain accommodations are required. As the polarity of the output signal is reversed on the leading and trailing edges of the read signal, the system must be able to read a like polarity, e.g., positive polarity, "1" on both the leading and trailing edges. In applicant's preferred embodiments this is accomplished in the following manner. The stored bit locations in the memory array are written with the information content stored in the true form in the odd numbered stored bit locations (as in the first sets of groups 1 – 16 of FIGS. 3*a*, 3*b*, 3*c*) while the stored bit locations in the memory array are written with the information content stored in the complement form in the even numbered stored bit locations in the memory array (as in the second sets of groups 1 – 16 of FIGS. 3*a*, 3*b*, 3*c*). This technique is necessary since the sense amplifiers must recognize a positive-odd and a positive-even output signal as being representative of a stored "1" and a negative-odd and a negative-even output signal as being representative of a stored "0."

I claim:

1. In a process for reading out the information content of a multibit memory word, the method comprising:

arranging all the memory elements of said memory word along a word line for storing the ordered bits of said memory word;

forming a first group of bits from the memory elements of said memory word;

forming a separate second group of bits from the other remaining memory elements of said memory word;

coupling a separate digit line to each of said memory elements;

simultaneously coupling a unipolar read signal having a leading and a trailing edge to said word line for simultaneously affecting all of said memory elements on both said leading and trailing edges;

simultaneously generating in all of said digit lines output signals from all of said memory elements on both said leading and trailing edges;

simultaneously gating out, from the digit lines coupled only to the memory elements of said first group of bits, said output signals generated on said leading edge; and subsequently, simultaneously gating out, from the digit lines coupled only to the memory elements of said second group of bits, said output signals generated on said trailing edge.

2. The method of claim 1 further including:

forming said digit lines by plating a thin-ferromagnetic-film layer on an electrical conductor; and, forming the memory elements of said memory word from the portions of said layers that are inductively coupled to said word line.

3. In an apparatus for reading out the information content of a multibit memory word, the combination comprising:

a word line;

a plurality of memory elements arranged along said word line for storing all the ordered bits of a multibit memory word, said bits arranged in separate first and second groups;

a separate digit line coupled to each of said memory elements;

readout means selectively coupling a unipolar read signal to said word line, said read signal having a leading and a trailing edge, for simultaneously affecting all of said memory elements on both said leading and trailing edges and simultaneously generating in all of said digit lines corresponding output signals;

a memory register having separate ordered stages corresponding to the ordered bits of said memory word;

gating means coupled to said digit lines for simultaneously coupling the output signals that are generated by the simultaneous affecting of all of the ordered bits of said first group of bits by the leading edge of said read signal to their corresponding ordered stages of said memory register and then subsequently simultaneously coupling the output signals that are generated by the simultaneous affecting of all of the ordered bits of said second group of bits by the trailing edge of said read signal to their corresponding ordered stages of said memory register.

4. The apparatus of Claim 3 in which said separate digit lines are electrical conductors that are plated with a thin-ferromagnetic-film layer and the memory elements of said memory word are the portions of said layers that are inductively coupled to said word line.

* * * * *